(12) United States Patent
Mathonnet et al.

(10) Patent No.: US 7,674,496 B2
(45) Date of Patent: Mar. 9, 2010

(54) METHOD FOR MAKING GRANULES

(75) Inventors: Jean-Pierre Mathonnet, Nice (FR); Gaetano Zannini, Nice (FR)

(73) Assignee: Laboratoires Docteur Gaetano Zannini, Saint Raphael (FR)

( * ) Notice: Subject to any disclaimer, the term of this patent is extended or adjusted under 35 U.S.C. 154(b) by 693 days.

(21) Appl. No.: 10/416,964

(22) PCT Filed: Feb. 16, 2001

(86) PCT No.: PCT/FR01/00462

§ 371 (c)(1), (2), (4) Date: Nov. 6, 2003

(87) PCT Pub. No.: WO02/40144

PCT Pub. Date: May 23, 2002

(65) Prior Publication Data

US 2004/0067306 A1     Apr. 8, 2004

(30) Foreign Application Priority Data

Nov. 16, 2000   (FR)  .................................. 00 14918

(51) Int. Cl.
*B05D 7/00*     (2006.01)
*B05D 3/02*     (2006.01)

(52) U.S. Cl. .................... 427/212; 427/242; 427/372.2; 427/377; 427/379; 427/421

(58) Field of Classification Search ................ 427/212, 427/242, 372.2, 377, 379, 421
See application file for complete search history.

(56) References Cited

U.S. PATENT DOCUMENTS

| 2,853,420 | A | * | 9/1958 | Lowey | ........................ 424/470 |
| 3,398,225 | A | * | 8/1968 | Bellin | ......................... 424/496 |
| 3,463,097 | A | * | 8/1969 | Monheim | .................... 426/415 |
| 4,675,140 | A | * | 6/1987 | Sparks et al. | ................. 264/4.3 |
| 5,434,102 | A | * | 7/1995 | Watanabe et al. | .............. 438/3 |
| 5,917,110 | A | * | 6/1999 | Kust | .............................. 71/27 |
| 5,965,165 | A | * | 10/1999 | Zannini et al. | .............. 424/489 |

FOREIGN PATENT DOCUMENTS

| DE | 199 04 657 | 8/2000 |
| FR | 2 132 521 | 11/1972 |
| WO | WO 91/09989 | 7/1991 |
| WO | WO 97/04861 | 2/1997 |

OTHER PUBLICATIONS

Merriam-Webster's Collegiate Dictionary, tenth edition.*

* cited by examiner

*Primary Examiner*—Elena T Lightfoot
(74) *Attorney, Agent, or Firm*—Westerman, Hattori, Daniels & Adrian, LLP

(57) ABSTRACT

The invention concerns a method for making granules which comprises coating, in a rotary drum, a core with at least a coating layer comprising at least of a solution and then drying the coated core, after each new coating. Drying is carried out in the rotary drum and comprises the following phases: mild drying by spraying a lukewarm gas stream corresponding to a temperature between 25° C. and 35° C.; strong drying by spraying a hot gas stream corresponding to a temperature between 40° C. and 50° C.; final drying by spraying a lukewarm gas stream corresponding to a temperature between 25° C. and 35° C. The invention is applicable in particular to granules for aromatic, cosmetic, food or dietetic use.

16 Claims, No Drawings

METHOD FOR MAKING GRANULES

The present invention relates to a process for the production of granules which can find application particularly for fragrance, cosmetic, foodstuff or dietetic usages.

BACKGROUND ART

In this field, a process for the production of solid granules including aromatic, food, dietetic or cosmetic substances is already known from WO 97/04861.

This prior process consists in: forming a core serving as a support, constituted by excipients associated or not with active substances, covering the core in three steps with at least one layer, these three steps being carried out for each successive layer by:

coating the core with active substances associated or not with excipients, drying the layer, screening the covered core.

The granules obtained by this type of process are particularly advantageous and can constitute granules to be chewed, sucked, swallowed or dissolved and can contain vegetable extracts and essential oils (or the like).

SUMMARY OF THE INVENTION

Although giving good results, the process according to WO 97/04861 can be improved, because it lacks productivity.

The main problem posed by this prior reference is the time of production of the granules, which is much too long.

That is, the time of screening and drying is long. Time savings reside in reducing the number of screenings, avoiding rotary drum-drying screen transfers and drying the granules dynamically and much more rapidly.

Moreover, the drying step requires a transfer of the granules into an oven which corresponds to an additional step which adds transfer time to the overall production time.

The present invention makes it possible to overcome the drawbacks of the present techniques, and provides to this end an improved process.

In the first place, this process makes it possible to reduce considerably the production time of the granules.

To this effect, the invention has the advantage of omitting the step of transferring to an oven to carry out drying, as well as most of the screenings.

To this end, the drying step is performed in the same medium as the step of coating the core, in a rotary drum.

Moreover, the process here proposed has the advantage of using different successive steps for drying, which makes it possible to optimize it.

In particular, complete drying begins when coating of the core has been carried out, and this at a moderate temperature.

Once this fundamental drying has been carried out, stronger drying is carried out and then temperature is lowered for a third drying, under a heated flow at moderate temperature.

The use of such drying steps has the advantage of producing a progressive temperature increase of the granules, which makes it possible to avoid any thermal shock and thus, to improve substantially the manufacturing quality.

Another advantage of the invention is that drying is carried out in a rotary drum, which extends the cycle of rotating the granules.

In this way, there is realized an even better sphericity and granulometric homogeneity of the granules obtained, and the number of screenings required is reduced.

DETAILED DESCRIPTION OF PARTICULAR EMBODIMENTS

Other objects and advantages will become apparent from the description which follows.

The present invention relates to a process for the production of granules, particularly for aromatic, cosmetics, foodstuff or dietetic use, consisting in coating in a turbine a core with at least one coating layer constituted by at least one solution, then drying the coated core, after each new coating, characterized by the fact that drying is performed in the rotary drum in operation and comprises the following phases:

gentle drying by projection of a warm gas flow corresponding to a temperature between 25° C. and 35° C.;

strong drying by projection of a hot gas flow corresponding to a temperature between 40° C. and 50° C.;

terminal drying by projection of a warm gas flow corresponding to a temperature between 25° C. and 35° C.

This process will comprise, according to preferred modifications of the invention, the following steps:

it comprises, after drying, a cooling phase to ambient temperature;

the gaseous flow is a flow of purified and filtered air;

to constitute each coating layer, the following is used:

a binding solution, a micronized powder;

for each coating layer, the binding solution is sprayed on the core and a pause is carried out so as to permit impregnation of the core, before depositing the micronized powder;

screening of the granules is performed only at the end of the operation;

the core and/or the coating layers comprise at least one active substance.

The type of granules obtained by the process according to the invention is not limited and reference can be made to patent application WO 97/04861 for several examples of embodiments and of particular compositions.

Generally speaking, the process consists in providing different superposed coating layers, starting from a basic core.

At least one layer is required, but several layers are generally provided.

As already exists in the prior art, the coating according to the invention uses at least one solution.

Once the core is impregnated by the solution, the deposited layer of solution can be dried in a drying step.

After drying, if necessary, a fresh coating can be provided by a new deposit of the solution on the surface of the core.

According to the invention, drying is performed in a rotary drum which is the same as the rotary drum that was used to coat the core.

Moreover, the rotary drum is maintained in rotation so as to continue the movement of the granules, which optimizes greatly the circulation of the gaseous flow used for drying.

In this regard, the drying step comprises several different steps, particularly with respect to the temperature of the gas flow which is projected on the granules.

In a first step, a gentle drying is carried out by projection of a warm gas flow.

The term "warm" means a temperature comprised between 25° C. and 35° C.

This gentle drying step makes it possible to dry throughout the core of the granule thus coated and ensures progressive increase of the temperature of the granule.

In a second step, a stronger drying is carried out by projection of a hot gas flow.

The term "hot" means a temperature of the gaseous flow comprised between 40° C. and 50° C.

This step at higher temperature increases the drying speed of the granule.

In particular, the layer of deposited solution will be fixed more quickly in this step.

In a third step, a terminal drying is carried out by projecting again a warm gas flow, which is to say at a temperature comprised between 25° C. and 35° C.

For reasons of simplicity, a flow at the same temperature as that used for the preliminary gentle drying can be used.

The terminal drying makes it possible to reduce progressively the temperature of the granules, preferably before a cooling step to ambient temperature.

This cooling step can be carried out under a flow of air at ambient temperature, which is to say substantially about 20° C.

Preferably, the gaseous flows projected on the granules are air flows.

When cooling has been achieved, the steps of coating and drying can be repeated as often as necessary.

Screening of the granules is no longer necessary after each coating. Only a few screenings, or even a single screening at the end of the operation is carried out.

Preferably, the coating layer used in the present production process is composed of two components in different phases.

Thus, in addition to the solution used which, according to this modification, is a solution with binding properties, a micronized powder is used.

The micronized powder has an additional function, which is to give quickly a large volume to the granules.

The micronized powder cooperates with the binding solution by being fixed thereon.

Thus, in each coating layer, the binding solution can be sprayed on the core, then after a possible pause, the micronized powder can be deposited.

By way of example, the production process in this case can be practiced by using a core based on maltitol, or else a mixture of sodium bicarbonate and citrate. Pollen grains could also be used.

Again by way of example, the binding solution according to the invention could comprise essential oils, emulgin as well as Luviskol (trademark of BASF). Citric acid could also be present.

As to the micronized powder, it could also be maltitol.

Generally speaking, but depending on the uses, the core and/or the coating layers (at the level of the micronized powder or the binding solution) comprise one or several active substances.

They could be fluid extracts or essential oils, for example.

As to the time of drying, the following sample shows the rapidity of the cycle, for production of 5 kg of granules in a test turbine:

gentle drying: 1 minute at 30° C.
strong drying: 2 minutes at 45° C.
terminal drying: 1 minute at 30° C.

Then, cooling to ambient temperature of 5 minutes was carried out.

For its part, the deposition of the coating layer by impregnation took 5 minutes, before drying.

Overall, covering with one layer took 15 minutes instead of about 2 hours 30 minutes according to the prior art.

The invention claimed is:

1. A process for the production of granules for fragrance, cosmetic, foodstuff or dietetic use, comprising:
    coating, in a rotary drum, a core with a plurality of coating layers, each of said plurality of coating layers comprising at least one binding solution of a coating material,
    then drying the coated core in the rotary drum after coating of each new coating layer and before coating of a next coating layer, and
    then screening after drying of a last coating layer,
    wherein the drying of each new coating layer takes place in the rotary drum and comprises the following phases:
        gentle drying by a warm gas flow having a temperature between 25° C. and 35° C.;
        strong drying by a hot gas flow having a temperature between 40° C. and 50° C.;
        terminal drying by a warm gas flow having a temperature between 25° C. and 35° C.; and
    wherein the coating and drying of each new coating layer takes place within about 15 minutes.

2. The process for the production of granules according to claim 1, wherein the gas flow is a flow of purified and filtered air.

3. The process for the production of granules according to claim 1, wherein each coating layer comprises at least one binding solution and a micronized powder.

4. The process for the production of granules according to claim 3, wherein for each coating layer, the binding solution is sprayed on the core and permitted to impregnate the core or the coated core, then the micronized powder is deposited.

5. The process for the production of granules according to claim 2, wherein at least one of the core and the coating layers comprise at least one active substance.

6. The process for the production of granules according to claim 1, wherein the rotary drum is held in rotation during drying.

7. The process for the production of granules according to claim 1, wherein at least one of the core and the coating layers comprise at least one active substance.

8. The process for the production of granules according to claim 7, wherein the core comprises at least one active substance.

9. The process for the production of granules according to claim 7, wherein at least one of the coating layers comprises at least one active substance.

10. A process for the production of granules for fragrance, cosmetic, foodstuff or dietetic use, comprising the steps of:
    coating a core contained in a rotary drum with a coating material solution to form a coated core with a coating layer by spraying a binding solution on said core, allowing said binding solution to impregnate said core, and then depositing a powder;
    drying the coated core contained in the rotary drum by supplying gas into the rotary drum to form a dried coated core,
    coating the dried coated core contained in the rotary drum with at least one additional coating material solution by spraying a binding solution on said dried coated core, allowing said binding solution to impregnate, and then depositing a powder, to produce a core coated with superposed coating layers;
    drying the coated core contained in the rotary drum after coating each additional coating material solution and before coating a next additional coating material solution is applied, the by supplying, into said rotary drum, (i) a first gas flow at a gentle drying temperature, (ii) a second gas flow at a strong drying temperature, and (iii) a third gas flow at a gentle drying temperature; and screening the dried coated core with superposed coating layers thereupon after coating and drying a final additional coating material solution, wherein coating of each coating layer and drying of each coating layer, together, take place within about 15 minutes.

11. The process of claim 10, wherein supplying gas in the drying step consists of: (i) supplying the first gas flow gentle drying temperature between 25° C. and 35° C., (ii) supplying the second gas flow strong drying temperature between 40° C. and 50° C., and (iii) supplying the third gas flow temperature between 25° C. and 35° C.

12. The process of claim 10, wherein the rotary drum is held in rotation during drying.

13. The process for the production of granules according to claim 10, wherein at least one of the core and the coating layers comprise at least one active substance.

14. The process for the production of granules according to claim 13, wherein the core comprises at least one active substance.

15. The process for the production of granules according to claim 13, wherein the coating layers comprise at least one active substance.

16. The process of claim 10, wherein the powder is micronized.

* * * * *